United States Patent
Cai et al.

(10) Patent No.: US 10,361,937 B2
(45) Date of Patent: Jul. 23, 2019

(54) METHOD AND APPARATUS FOR DETECTING OPERATING STATUS OF NODE

(71) Applicant: Huawei Technologies Co., Ltd., Shenzhen, Guangdong (CN)

(72) Inventors: Tao Cai, Shenzhen (CN); Li Li, Bridgewater, NJ (US); Zhihong Qiu, Shenzhen (CN); Yulong Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 138 days.

(21) Appl. No.: 15/583,640

(22) Filed: May 1, 2017

(65) Prior Publication Data

US 2017/0237637 A1 Aug. 17, 2017

Related U.S. Application Data

(63) Continuation of application No. PCT/CN2014/093707, filed on Dec. 12, 2014.

(51) Int. Cl.
*H04L 12/28* (2006.01)
*H04L 12/26* (2006.01)
(Continued)

(52) U.S. Cl.
CPC ...... *H04L 43/0817* (2013.01); *H04L 43/0847* (2013.01); *H04L 43/16* (2013.01); *H04L 61/6068* (2013.01); *H04L 65/608* (2013.01)

(58) Field of Classification Search
None
See application file for complete search history.

(56) References Cited

U.S. PATENT DOCUMENTS

2004/0066753 A1* 4/2004 Grovenburg ............ H04L 43/00
370/252
2007/0172051 A1 7/2007 Hoffmann
(Continued)

FOREIGN PATENT DOCUMENTS

CN 101488967 A 7/2009
CN 101521900 A 9/2009
(Continued)

OTHER PUBLICATIONS

"OpenFlow Table Type Patterns, Version No. 1.0", Open Networking Foundation, Aug. 15, 2014, 55 pages.
(Continued)

*Primary Examiner* — Bob A Phunkulh

(57) ABSTRACT

A method and an apparatus for detecting an operating status of a node is provided. The method is as follows: selecting, from nodes of a transmission link established between a transmit end and a receive end, one node in the nodes as a to-be-detected node, and sending a detection instruction to the to-be-detected node; receiving a real-time control packet and a first quantity of IP data packets forwarded by the to-be-detected node, where the real-time control packet and the first quantity are returned by the to-be-detected node based on the detection instruction; determining, according to the real-time control packet, a second quantity of IP data packets that the to-be-detected node needs to bear; and obtaining a specified threshold and a quantity difference between the first quantity and the second quantity, and determining an operating status of the to-be-detected node according to the quantity difference and a value of the threshold.

20 Claims, 2 Drawing Sheets

(51) Int. Cl.
*H04L 29/12* (2006.01)
*H04L 29/06* (2006.01)

(56) References Cited

U.S. PATENT DOCUMENTS

| | | | | |
|---|---|---|---|---|
| 2008/0219177 | A1* | 9/2008 | Flynn | H04L 41/5003 370/252 |
| 2010/0142377 | A1* | 6/2010 | Caciula | H04L 43/50 370/241 |
| 2011/0022700 | A1* | 1/2011 | Ramanath | G06F 3/0481 709/224 |
| 2011/0029678 | A1* | 2/2011 | Buciuc | G06F 9/541 709/228 |
| 2011/0069621 | A1* | 3/2011 | Gintis | H04L 43/50 370/250 |
| 2011/0069626 | A1* | 3/2011 | Sun | H04L 41/5038 370/252 |
| 2011/0142034 | A1 | 6/2011 | Wu et al. | |
| 2011/0249808 | A1* | 10/2011 | Pavel | H04M 3/2227 379/26.01 |
| 2012/0014256 | A1* | 1/2012 | Bancila | H04L 43/50 370/241 |
| 2012/0033562 | A1* | 2/2012 | Gruber | H04L 43/50 370/252 |
| 2012/0078566 | A1* | 3/2012 | Gintis | H04L 41/0866 702/119 |
| 2012/0120254 | A1* | 5/2012 | Tan | H04N 21/23805 348/184 |
| 2015/0180743 | A1* | 6/2015 | Jana | H04L 43/045 715/736 |
| 2015/0244650 | A1* | 8/2015 | Yang | H04N 21/44209 348/180 |

FOREIGN PATENT DOCUMENTS

| | | |
|---|---|---|
| CN | 101656640 A | 2/2010 |
| CN | 101719808 A | 6/2010 |
| CN | 101969661 A | 2/2011 |
| CN | 102118300 A | 7/2011 |
| CN | 103780619 A | 5/2014 |
| JP | 4020835 B2 | 12/2007 |

OTHER PUBLICATIONS

Michael Karl et al., "Multimedia Optimized Routing in OpenFlow Networks", ICON 2013, 2013, 6 pages.

* cited by examiner

METHOD AND APPARATUS FOR DETECTING OPERATING STATUS OF NODE

CROSS-REFERENCE TO RELATED APPLICATIONS

This application is a continuation of International Application No. PCT/CN2014/093707, filed on Dec. 12, 2014, the disclosure of which is hereby incorporated by reference in its entirety.

TECHNICAL FIELD

The present disclosure relates to the field of communications technologies, and in particular, to a method and an apparatus for detecting an operating status of a node.

BACKGROUND

In a multimedia data real-time transmission scenario, such as a video conference or online live telecasting of a video, transmission and control are generally performed on video data and audio data by using a Real-Time Transport Protocol (RTP)/a Real-Time Transport Control Protocol (RTCP). The video data and/or the audio data are/is collectively referred to as streaming media data. The RTP is responsible for encapsulating the streaming media data, and transmitting the encapsulated streaming media data in real time by using an RTP packet. The RTCP is responsible for monitoring an RTP packet transceiving situation separately at a transmit end and a receive end, and periodically exchanging reports about the RTP packet transceiving situation between the transmit end and the receive end by using an RTCP packet. In this way, dynamic network status information is provided.

The RTP only can ensure transmission of real-time streaming media data, and cannot provide a reliable transport mechanism or traffic control or congestion control for sequential transmission of streaming media data packets. In an RTCP packet, statistical report information of the RTP packet transceiving situation collected by the receive end may be encapsulated, such that the transmit end can dynamically adjust an RTP packet transmission speed according to the information, and perform congestion control on a network.

The receive end encapsulates, at an interval in a receiver report (Receiver Report) (referred to as RR below) packet format in an RTCP packet, statistical information of an RTP packet received by the receive end, such as a quantity of lost packet, a jitter, and a delay, and returns the encapsulated statistical intonation to the transmit end. If determining that a network is in a good condition according to data in the RR packet, the transmit end can increase a video sending frame rate or improve video quality; or if determining that the network is in a bad condition according to the data in the RR packet, the transmit end can increase voice delay time to ensure voice continuity, or decrease the video sending frame rate or lower voice quality to reduce network congestion.

However, when the transmit end determines that the multimedia data real-time transmission encounters a fault according to the RR packet, the transmit end only can adjust the RTP packet transmission speed, and cannot determine an operating status of each network node in a transmission process. As a result, fault maintenance of a node is delayed and multimedia data real-time transmission efficiency is lowered.

SUMMARY

Embodiments of the present disclosure provide a method for detecting an operating status of a node, so as to resolve a problem in the prior art that an operating status of each network node cannot be determined in a multimedia data real-time transmission process.

According to a first aspect, a method for detecting an operating status of a node includes:

selecting, from nodes included on a transmission link established between a transmit end and a receive end, one node in the nodes as a to-be-detected node, and sending a detection instruction to the to-be-detected node;

receiving a real-time control packet and a first quantity of Internet Protocol (IP) data packets forwarded by the to-be-detected node, where the real-time control packet and the first quantity are returned by the to-be-detected node based on the detection instruction, and the real-time control packet carries a quantity of all Real-time Transport Protocol (RTP) data packets sent by the transmit end and a quantity of bytes included in all the RTP data packets;

determining, according to the real-time control packet, a second quantity of IP data packets that the to-be-detected node needs to bear; and obtaining a specified threshold and a quantity difference between the first quantity and the second quantity, and determining an operating status of the to-be-detected node according to an absolute value of the quantity difference and a value of the threshold.

With reference to the first aspect, in a first possible implementation manner, the real-time control packet is a Real-Time Transport Control Protocol (RTCP) packet.

With reference to the first aspect or the first possible implementation manner of the first aspect, in a second possible implementation manner, the determining, according to the real-time control packet, a second quantity of IP data packets that the to-be-detected node needs to bear includes:

parsing the real-time control packet to obtain a third quantity of all the RTP data packets sent by the transmit end and a fourth quantity of bytes included in all the RTP data packets, where the real-time control packet carries the third quantity and the fourth quantity;

separately obtaining a maximum transmission unit (MTU) value corresponding to a link between any two adjacent nodes in nodes, in the transmission link, that are between the transmit end and the to-be-detected node; and determining, according to the third quantity, the fourth quantity, and the MTU value, the second quantity of the IP data packets that the to-be-detected node needs to bear.

With reference to the second possible implementation manner of the first aspect, in a third possible implementation manner, the determining, according to the third quantity, the fourth quantity, and the MTU value, the second quantity of the IP data packets that the to-be-detected node needs to bear includes:

obtaining, by means of screening, a minimum MTU value from the MTU values as a target MTU value;

determining a quantity of valid bearer bytes in the target MTU value according to the target MTU value;

obtaining, according to the third quantity, the fourth quantity, and the quantity of the valid bearer bytes, a quantity of IP data packets that need to be borne for transmitting each RTP data packet; and obtaining, based on the third quantity and the quantity of the IP data packets that need to be borne for transmitting each RTP data packet, the second quantity of the IP data packets that the to-be-detected node needs to bear.

With reference to anyone of the first aspect or the foregoing possible implementation manners of the first aspect, in a fourth possible implementation manner, the determining an operating status of the to-be-detected node according to an absolute value of the quantity difference and a value of the threshold includes:

determining that the operating status of the to-be-detected node is a normal state when the absolute value of the quantity difference is less than the threshold; or determining that the operating status of the to-be-detected node is a faulty state when the absolute value of the quantity difference is greater than or equal to the threshold.

With reference to any one of the first aspect or the foregoing possible implementation manners of the first aspect, in a fifth possible implementation manner, the selecting one node in the nodes as a to-be-detected node includes:

selecting, as the to-be-detected node, an undetected node that is in the nodes and that is at a shortest distance from the receive end; or selecting, as the to-be-detected node, an undetected node that is in the nodes and that is at a middle location between the transmit end and the receive end.

With reference to any one of the first aspect or the foregoing possible implementation manners of the first aspect, in a sixth possible implementation manner, the sending a detection instruction to the to-be-detected node includes:

sending, to the to-be-detected node, a detection instruction carrying a transmit end IP address, a receive end IP address, and an RTCP port number.

According to a second aspect, an apparatus for detecting an operating status of a node includes:

a selection unit, configured to select, from nodes included on a transmission link established between a transmit end and a receive end, one node in the nodes as a to-be-detected node, and send a detection instruction to the to-be-detected node;

a receiving unit, configured to receive a real-time control packet and a first quantity of Internet Protocol (IP) data packets forwarded by the to-be-detected node, where the real-time control packet and the first quantity are returned by the to-be-detected node based on the detection instruction, and the real-time control packet carries a quantity of all Real-time Transport Protocol (RTP) data packets sent by the transmit end and a quantity of bytes included in all the RTP data packets;

a calculation unit, configured to determine, according to the real-time control packet, a second quantity of IP data packets that the to-be-detected node needs to bear; and a processing unit, configured to obtain a specified threshold and a quantity difference between the first quantity and the second quantity, and determine an operating status of the to-be-detected node according to an absolute value of the quantity difference and a value of the threshold.

With reference to the second aspect, in a first possible implementation manner, the real-time control packet is a Real-Time Transport Control Protocol (RTCP) packet.

With reference to the second aspect or the first possible implementation manner of the second aspect, in a second possible implementation manner, the calculation unit is further configured to:

parse the real-time control packet to obtain a third quantity of all the RTP data packets sent by the transmit end and a fourth quantity of bytes included in all the RTP data packets, where the real-time control packet carries the third quantity and the fourth quantity;

separately obtain a maximum transmission unit (MTU) value corresponding to a link between any two adjacent nodes in nodes, in the transmission link, that are between the transmit end and the to-be-detected node; and determine, according to the third quantity, the fourth quantity, and the MTU value, the second quantity of the IP data packets that the to-be-detected node needs to bear.

With reference to the second possible implementation manner of the second aspect, in a third possible implementation manner, when determining, according to the third quantity, the fourth quantity, and the MTU value, the second quantity of the IP data packets that the to-be-detected node needs to bear, the calculation unit is further configured to:

obtain, by means of screening, a minimum MTU value from the MTU values as a target MTU value;

determine a quantity of valid bearer bytes in the target MTU value according to the target MTU value;

obtain, according to the third quantity, the fourth quantity, and the quantity of the valid bearer bytes, a quantity of IP data packets that need to be borne for transmitting each RTP data packet; and obtain, based on the third quantity and the quantity of the IP data packets that need to be borne for transmitting each RTP data packet, the second quantity of the IP data packets that the to-be-detected node needs to bear.

With reference to any one of the second aspect or the foregoing possible implementation manners of the second aspect, in a fourth possible implementation manner, when determining the operating status of the to-be-detected node according to the absolute value of the quantity difference and the value of the threshold, the processing unit is further configured to:

determine that the operating status of the to-be-detected node is a normal state when the absolute value of the quantity difference is less than the threshold; or determine that the operating status of the to-be-detected node is a faulty state when the absolute value of the quantity difference is greater than or equal to the threshold.

With reference to any one of the second aspect or the foregoing possible implementation manners of the second aspect, in a fifth possible implementation manner, when selecting one node in the nodes as the to-be-detected node, the selection unit is further configured to:

select, as the to-be-detected node, an undetected node that is in the nodes and that is at a shortest distance from the receive end; or select, as the to-be-detected node, an undetected node that is in the nodes and that is at a middle location between the transmit end and the receive end.

With reference to any one of the second aspect or the foregoing possible implementation manners of the second aspect, in a sixth possible implementation manner, when sending the detection instruction to the to-be-detected node, the selection unit is further configured to:

send, to the to-be-detected node, a detection instruction carrying a transmit end IP address, a receive end IP address, and an RTCP port number.

In the embodiments of the present disclosure, the embodiments of the present disclosure provide the method and the apparatus for detecting an operating status of a node. In the method, one node in nodes of a transmission link established between a transmit end and a receive end is selected as a to-be-detected node, and a detection instruction is sent to the to-be-detected node; a real-time control packet and a first quantity of IP data packets forwarded by the to-be-detected node are received, where the real-time control packet and the first quantity are returned by the to-be-detected node based on the detection instruction; a second quantity of IP data packets that the to-be-detected node needs to bear is determined according to the real-time control packet; and a specified threshold and a quantity difference of the first quantity and the second quantity are obtained, and an operating status of the to-be-detected node is determined according to an absolute value of the quantity difference and a value of the threshold, where the real-time control packet carries a quantity of all RTP data packets sent by the transmit end and a quantity of bytes included in all the RTP data packets. According to the real-time control packet, an operating status of a node in a network can be obtained quickly and accurately. When an operating status of each node in the network is obtained, a fault source can be located. This avoids a problem that fault maintenance of a node is delayed and multimedia data real-time transmission efficiency is lowered because a fault source cannot be located.

DETAILED DESCRIPTION

Figure 1:
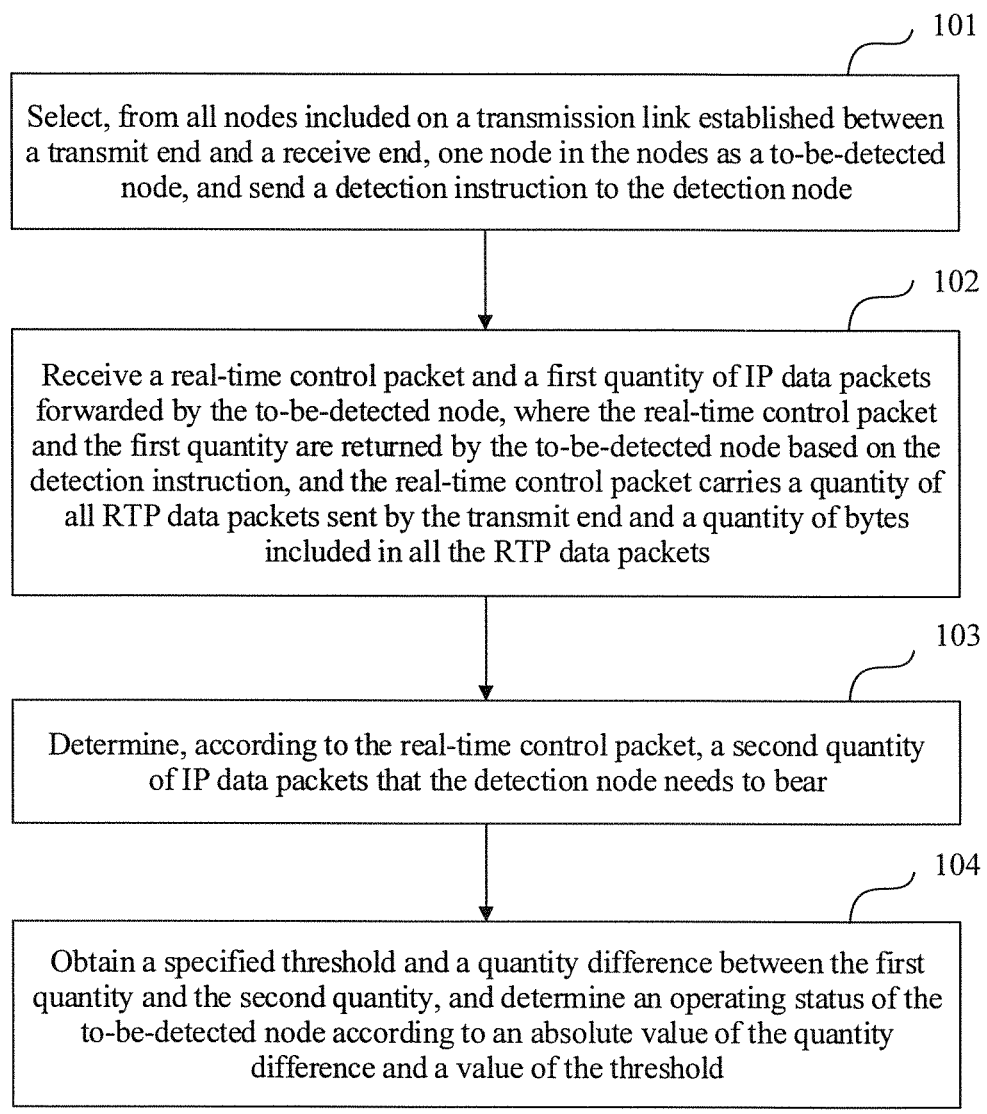
FIG. 1 is a flowchart of a method for detecting an operating status of anode according to an embodiment of the present disclosure.

By using technical solutions of the present disclosure, one node in nodes of a transmission link established between a transmit end and a receive end is selected as a to-be-detected node, and a detection instruction is sent to the to-be-detected node; a real-time control packet and a first quantity of IP data packets forwarded by the to-be-detected node are received, where the real-time control packet and the first quantity are returned by the to-be-detected node based on the detection instruction; a second quantity of IP data packets that the to-be-detected node needs to bear is determined according to the real-time control packet; and a specified threshold and a quantity difference of the first quantity and the second quantity are obtained, and an operating status of the to-be-detected node is determined according to an absolute value of the quantity difference and a value of the threshold, where the real-time control packet carries a quantity of all RTP data packets sent by the transmit end and a quantity of bytes included in all the RTP data packets. According to the real-time control packet, an operating status of a node in a network can be obtained quickly and accurately. When an operating status of each node in the network is obtained, a fault source can be located. This avoids a problem that fault maintenance of a node is delayed and multimedia data real-time transmission efficiency is lowered because a fault source cannot be located.

An embodiment of the present disclosure provides a method for detecting an operating status of a node, and the method is applicable to a network monitoring device in a multimedia real-time transmission network, such as a software defined networking (SDN) controller. The following describes in detail implementation manners of the present disclosure with reference to accompanying drawings.

In a multimedia real-time transmission network, a transmit end transmits an RTP data packet by using one unused even port number in port numbers 1025 to 65535. However, in a same session, the transmit end and a receive end transmit an RTCP data packet by using one odd port number next to the even port number.

In a multimedia real-time transmission process, the transmit end continuously sends an encapsulated RTP packet, namely, an RTP data packet to the receive end, that is, one RTP packet is corresponding to one RTP data packet. Multiple RTP data packets form an RTP stream.

When the transmit end sends an RTP stream to the receive end, the transmit end/the receive end periodically sends an RTCP packet to the receive end/the transmit end. The RTCP packet includes statistical report information of an RTP packet transceiving situation collected by the transmit end/the receive end. The RTCP packet sent by the receive end is referred to as a receiver report (RR) packet, and the RTCP packet sent by the transmit end is referred to as a sender report (SR) packet.

The SR packet carries a quantity of RTP data packets sent by the transmit end from a beginning of sending the RTP stream by the transmit end to generation of the SR packet and a total quantity of bytes included in all the RTP data packets sent by the transmit end from the beginning of sending the RTP stream by the transmit end to the generation of the SR packet.

The transmission link established between the transmit end and the receive end includes at least one node. The node may be but is not limited to a switch. Because a quantity of bytes of an RTP data packet may be greater than a maximum transmission unit (MTU) value, when the quantity of the bytes of the RTP data packet is less than or equal to the MTU value, the RTP data packet is encapsulated in one Internet Protocol (IP) data packet for transmission; when the quantity of the bytes of the RTP data packet is greater than the MTU value, the RTP data packet is divided into multiple IP data packets for transmission.

The MTU value is a maximum quantity of bytes of a single packet that a current link can bear. Because the transmission link between the transmit end and the receive end includes several links between adjacent nodes, MTU values corresponding to links between every two adjacent nodes may be different.

As shown in FIG. 1, an embodiment of the present disclosure provides a method for detecting an operating status of a node. A processing flow of the method includes the following steps.

Step 101: Select, from nodes included on a transmission link established between a transmit end and a receive end, one node as a to-be-detected node, and send a detection instruction to the to-be-detected node.

It may be learned from the foregoing description that, several nodes, such as a switch, exist in the transmission link between the transmit end and the receive end for forwarding data. Both the transmit end and the receive end are included nodes. When detecting a network status between the transmit end and the receive end, a network monitoring device first needs to determine each node between the transmit end and the receive end.

In an example 1, one transmission link is established between a transmit end A and a receive end B to send an RTP stream, and the RTP stream successively passes through n SDN switches: $S_1, S_2, \ldots,$ and $S_n$ from A to B. Therefore, in step 101, the network monitoring device needs to determine the nodes $S_1, S_2, \ldots,$ and $S_n$.

The selecting one node from nodes as a to-be-detected node includes the following two manners:

Manner 1: selecting, as the to-be-detected node, an undetected node that is in the determined nodes and that is at a shortest distance from the receive end. Still in the example 1, a node $S_n$ that is at a shortest distance from the receive end is selected as the to-be-detected node.

Manner 2: selecting, as the to-be-detected node, an undetected node that is in the determined nodes and that is at a middle location between the transmit end and the receive end. Still in the example 1, the selecting a node that is at a middle location between the transmit end and the receive end is as follows: selecting a node $S_{(n+1)/2}$ as the to-be-detected node when n is an odd number; or selecting a node $S_{n/2}$ as the to-be-detected node when n is an even number.

The sending a detection instruction to the to-be-detected node includes:

sending, to the to-be-detected node, a detection instruction carrying a transmit end IP address, a receive end IP address, and an RTCP port number.

When determining the to-be-detected node, the network monitoring device sends the detection instruction to the to-be-detected node. The detection instruction is an SDN flow entry that includes the transmit end IP address, the receive end IP address, and the RTCP port number that is used to transmit an RTCP packet in a current session. After receiving the detection instruction, the to-be-detected node finds out, according to the detection instruction, the RTCP packet, namely, the SR packet, that is sent from the transmit end to the receive end and that matches the transmit end IP address, the receive end IP address, and the RTCP port number, and the to-be-detected node reports the RTCP packet to the network monitoring device.

The detection instruction further includes a query instruction, which is used to query a first quantity of IP data packets forwarded by the to-be-detected node.

Step 102: Receive a real-time control packet and a first quantity of IP data packets forwarded by the to-be-detected node, where the real-time control packet and the first quantity are returned by the to-be-detected node based on the detection instruction, and the real-time control packet carries a quantity of all RTP data packets sent by the transmit end and a quantity of bytes included in all the RTP data packets.

Optionally, the real-time control packet may be but is not limited to an RTCP packet. In this embodiment of the present disclosure, the RTCP packet is merely used as an example.

It may be learned from the description in step 101 that, after receiving the detection instruction, the to-be-detected node returns, based on the detection instruction and to the network monitoring device, the RTCP packet and the first quantity of the IP data packets forwarded by the to-be-detected node.

Step 103: Determine, according to the real-time control packet, a second quantity of IP data packets that the to-be-detected node needs to bear.

When step 103 is performed, the following steps are included:

parsing the real-time control packet to obtain a third quantity of all the RTP data packets sent by the transmit end and a fourth quantity of bytes included in all the RTP data packets, where the real-time control packet carries the third quantity and the fourth quantity;

separately obtaining an MTU value corresponding to a link between any two adjacent nodes in nodes, in the current transmission link, that are between the transmit end and the to-be-detected node; and determining, according to the third quantity, the fourth quantity, and the obtained MTU value, the second quantity of the IP data packets that the to-be-detected node needs to bear.

The determining, according to the third quantity, the fourth quantity, and the obtained MTU value, the second quantity of the IP data packets that the to-be-detected node needs to bear includes:

obtaining, by means of screening, a minimum MTU value from the obtained MTU values as a target MTU value;

determining a quantity of valid bearer bytes in the target MTU value according to the target MTU value;

obtaining, according to the third quantity, the fourth quantity, and the quantity of the valid bearer bytes, a quantity of IP data packets that need to be borne for transmitting each RTP data packet; and obtaining, based on the third quantity and the obtained quantity of the IP data packets that need to be borne for transmitting each RTP data packet, the second quantity of the IP data packets that the to-be-detected node needs to bear.

It may be learned from the foregoing description of the RTCP packet that, the RTCP packet (SR packet) sent by the transmit end to the receive end carries the quantity of the RTP data packets sent by the transmit end from the beginning of sending the RTP stream by the transmit end to the generation of the SR packet and the total quantity of the bytes included in all the RTP data packets sent by the transmit end from the beginning of sending the RTP stream by the transmit end to the generation of the SR packet. Therefore, after receiving the RTCP packet sent by the to-be-detected node, the network monitoring device parses the RTCP packet to obtain the third quantity of all the RTP data packets sent by the transmit end and the fourth quantity of the bytes included in all the RTP data packets, where the RTCP packet carries the third quantity and the fourth quantity.

The transmission link between the transmit end and the receive end includes multiple links between adjacent nodes, and MTU values corresponding to links between every two adjacent nodes are different; therefore, a minimum MTU value of a link formed between two adjacent nodes between the transmit end and the to-be-detected node needs to be selected to calculate the second quantity.

A quantity of valid bearer bytes in the target MTU value is obtained by subtracting a quantity of header bytes of an IP data packet, a quantity of header bytes of a User datagram protocol (UDP) data packet, and a quantity of padding bytes from the target MTU value. The quantity of the valid bearer bytes MTU_Payload_length in the target MTU value meets a condition of a formula 1:

$$\text{MTU\_Payload\_length} = \text{MTU\_length} - \text{IP\_Header\_length} - \text{UDP\_Header\_length} - \text{Padding\_length} \qquad \text{formula 1}$$

MTU_length is the target MTU value, IP_Header_length is the quantity of the header bytes of the IP data packet, UDP_Header_length is the quantity of the header bytes of the UDP data packet, and Padding_length is the quantity of the padding bytes.

$$\text{Padding\_length} = [\text{MTU\_length} - \text{IP\_Header\_length}] \mod 8.$$

The determining, according to the third quantity, the fourth quantity, and the quantity of the valid bearer bytes, the second quantity of the IP data packets that the to-be-detected node needs to bear meets a formula 2:

$$IP \text{ Packet Count} = \left\lceil \frac{\frac{\text{Octet Count}}{\text{Packet Count}}}{\text{MTU\_Payload\_length}} \right\rceil * \text{Packet Count} \qquad \text{formula 2}$$

IP Packet Count is the second quantity, Octet count is the fourth quantity, Packet count is the third quantity, MTU_Payload_length is the quantity of the valid bearer bytes, $$\left[ \frac{\frac{\text{Octet Count}}{\text{Packet Count}}}{\text{MTU\_Payload\_length}} \right]$$

is the quantity of the IP data packets that need to be borne for transmitting each RTP data packet.

Step 104: Obtain a specified threshold and a quantity difference between the first quantity and the second quantity, and determine an operating status of the to-be-detected node according to an absolute value of the quantity difference and a value of the threshold.

The determining an operating status of the to-be-detected node according to an absolute value of the quantity difference and a value of the threshold includes:

determining that the operating status of the to-be-detected node is a normal state when the absolute value of the quantity difference is less than the threshold; or determining that the operating status of the to-be-detected node is a faulty state when the absolute value of the quantity difference is greater than or equal to the threshold.

When the absolute value of the quantity difference is less than the specified threshold, no packet loss or delay occurs in an upstream network of the to-be-detected node. When the absolute value of the quantity difference is greater than or equal to the specified threshold, a packet loss or a delay may occur in the upstream network of the to-be-detected node. After this phenomenon sustains for a specified time period, a packet loss or a delay has occurred in the upstream network of the to-be-detected node.

Because the network monitoring device, such as an SDN controller, is characterized by separation of forwarding from control, and may control each node in the network in a centralized manner, the network monitoring device may determine an status of the entire network with reference to statistical information of the RTCP packet and statistical information of a switch in the network.

A probe packet is usually sent to each network device in the transmission link between the transmit end and the receive end by using a network fault diagnosis tool or a network detection tool to determine a network status of each network device. However, the probe packet and an actual RTP stream are usually transmitted at different network protocol layers. Therefore, a statistical result of the probe packet cannot truly reflect a transmission situation of the RTP stream. The network status, of the network device, determined according to the probe packet is incorrect. In addition, the probe packet further increases a network load, and reduces RTP stream transmission efficiency.

Obviously, a network status of a network device in a network cannot be accurately obtained by using a probe packet. In a multimedia data real-time transmission process, the probe packet increases a network load, reduces RTP stream transmission efficiency, causes a delay and a packet loss, and degrades user experience.

Compared with the prior art that a network status in a network is determined by using a probe packet, in the present disclosure, without changing a network status, a network monitoring device may accurately determine an operating status of a node between a transmit end and a receive end by using an RTCP packet instead of a probe packet or another detection device, such as a probe. This decreases a network load, and improves RTP stream transmission efficiency.

When an undetected node that is in the determined nodes and that is at a shortest distance from the receive end is selected as a first to-be-detected node, after it is determined that an operating status of the first to-be-detected node is a faulty state, the method further includes:

continuing to select, from nodes between the transmit end and the first to-be-detected node, an undetected node that is at a shortest distance from the receive end as a second to-be-detected node; and determining an operating status of the second to-be-detected node in a same manner, where when it is determined that the operating status of the second to-be-detected node is a normal state, it indicates that no packet loss or delay occurs in an upstream network device of the second to-be-detected node, that is, an operating status of each node (including the second to-be-detected node) between the transmit end and the second to-be-detected node is the normal state. The operating status of each node between the transmit end and the second to-be-detected node is the normal state, and the operating status of the adjacent first to-be-detected node is the faulty state. Obviously, it may be determined that the first to-be-detected node is a fault source.

When an undetected node that is in the determined nodes and that is at a middle location between the transmit end and the receive end is selected as a first to-be-detected node, after it is determined that an operating status of the first to-be-detected node is a faulty state, the method further includes:

continuing to select, from nodes between the transmit end and the first to-be-detected node, an undetected node that is at a middle location between the transmit end and the first to-be-detected node as a second to-be-detected node;

determining an operating status of the second to-be-detected node in a same manner, where when it is determined that the operating status of the second to-be-detected node is a normal state, it is determined that a fault source is located in a node between the first to-be-detected node and the second to-be-detected node, where the node does not include the second to-be-detected node but includes nodes such as the first to-be-detected node; and when it is determined that the network status of the second to-be-detected node is a faulty state, it is determined that a fault source is located in a node between the transmit end and the second to-be-detected node, including the second to-be-detected node; and continuing to select, from the node in which the fault source is located, a node that is at a middle location as a third to-be-detected node, until a node that is in normal state and that is adjacent to the node in the faulty state is determined, and then determining that the node in the faulty state is the fault source.

In this way, the network monitoring device may determine an operating status of each node in the network with reference to the statistical information of the RTCP packet and the statistical information of the switch in the network, so as to accurately determine, after determining status information of the entire network, a location in which a fault occurs in the network, thereby improving fault locating efficiency.

In an example 2, when the network monitoring device is an SDN controller, and a transmit end and a receive end perform multimedia real-time transmission by using n switches as nodes, a process of a method for detecting an operating status of a node is as follows:

Step 201: The SDN controller selects an undetected switch $S_n$ that is at a shortest distance from the receive end.

Step 202: The SDN controller delivers, to the switch $S_n$, an SDN flow entry that carries a transmit end IP address, a receive end IP address, and an RTCP port number, and requests the switch $S_n$ to report an RTCP packet that is sent by the transmit end and that matches information in the SDN flow entry.

Step 203: After receiving the RTCP packet sent by the switch $S_n$, the SDN controller parses out, from the RTCP packet, a third quantity of all RTP data packets sent by the transmit end and a fourth quantity of bytes included in all the RTP data packets, and calculates, according to the third quantity of all the RTP data packets sent by the transmit end and the fourth quantity of the bytes included in all the RTP data packets, a second quantity of IP data packets that the switch $S_n$ needs to bear.

Step 204: The SDN controller continues to deliver a query instruction to the switch $S_n$, to request the switch $S_n$ to report a first quantity of IP data packets forwarded by the switch $S_n$.

Step 205: The SDN controller compares a specified threshold with an absolute value of a difference between the second quantity and the first quantity.

Step 206: When the absolute value of the difference between the first quantity and the second quantity is less than the specified threshold, it indicates that an operating status of the switch $S_n$ and an upstream network is a normal state.

Step 207: When the absolute value of the difference between the first quantity and the second quantity is greater than or equal to the specified threshold, it indicates that an operating status of the switch $S_n$ or an upstream network is a faulty state. The SDN controller needs to continue with step 201 until a first switch $S_m$ in the normal state is found; in this case, it is determined that a fault occurs starting from a switch $S_{m+1}$, and the switch $S_{m+1}$ is a fault source.

In an example 3, when an SDN controller selects an undetected switch, a dichotomic search method may be further used to implement the method for detecting an operating status of a node of the present disclosure. A process is as follows.

An SDN controller is still used as an example of the network monitoring device. A quantity of switches between the transmit end and the receive end is five, and the switches are successively $S_1$, $S_2$, $S_3$, $S_4$, and $S_5$ from the transmit end to the receive end.

Step 301: The SDN controller selects the switch $S_3$ that is at a middle location between the transmit end and the receive end.

Step 302: The SDN controller delivers, to the switch $S_3$, an SDN flow entry that carries a transmit end IP address, a receive end IP address, and an RTCP port number, and requests the switch $S_3$ to report an RTCP packet that is sent by the transmit end and that matches information in the SDN flow entry.

Step 303: After receiving the RTCP packet sent by the switch $S_3$, the SDN controller parses out, from the RTCP packet, a third quantity of all RTP data packets sent by the transmit end and a fourth quantity of bytes included in all the RTP data packets, and calculates, according to the third quantity of all the RTP data packets sent by the transmit end and the fourth quantity of the bytes included in all the RTP data packets, a second quantity of IP data packets that the switch $S_3$ needs to bear.

Step 304: The SDN controller continues to deliver a query instruction to the switch $S_3$, to request the switch $S_3$ to report a first quantity of IP data packets forwarded by the switch $S_3$.

Step 305: The SDN controller compares a specified threshold with an absolute value of a difference between the second quantity and the first quantity.

Step 306: When the absolute value of the difference between the first quantity and the second quantity is less than the specified threshold, it indicates that an operating status of the switch $S_3$ and an upstream network is a normal state.

Step 307: When the absolute value of the difference between the first quantity and the second quantity is greater than or equal to the specified threshold, an operating status of the switch $S_3$ or an upstream network is a faulty state. The SDN controller needs to continue with step 301 to select the switch $S_2$ between the transmit end and $S_3$ until it is determined that the switch $S_2$ adjacent to the switch $S_3$ is in the normal state; in this case, it is determined that a fault occurs starting from the switch $S_3$, and the switch $S_3$ is a fault source.

Figure 2:
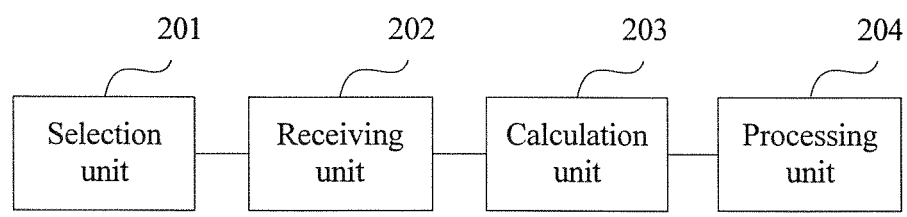
FIG. 2 is a schematic structural diagram of an apparatus for detecting an operating status of a node according to an embodiment of the present disclosure.

Based on the foregoing embodiment, as shown in FIG. 2, an embodiment of the present disclosure further provides an apparatus for detecting an operating status of a node. The apparatus includes a selection unit 201, a receiving unit 202, a calculation unit 203, and a processing unit 204.

The selection unit 201 is configured to select, from nodes included on a transmission link established between a transmit end and a receive end, one node in all the nodes as a to-be-detected node, and send a detection instruction to the to-be-detected node.

The receiving unit 202 is configured to receive a real-time control packet and a first quantity of Internet Protocol IP data packets forwarded by the to-be-detected node, where the real-time control packet and the first quantity are returned by the to-be-detected node based on the detection instruction, and the real-time control packet carries a quantity of all RTP data packets sent by the transmit end and a quantity of bytes included in all the RTP data packets.

The calculation unit 203 is configured to determine, according to the real-time control packet, a second quantity of IP data packets that the to-be-detected node needs to bear.

The processing unit 204 is configured to obtain a specified threshold and a quantity difference between the first quantity and the second quantity, and determine an operating status of the to-be-detected node according to an absolute value of the quantity difference and a value of the threshold.

Optionally, the real-time control packet is a Real-Time Transport Control Protocol RTCP packet.

The calculation unit 203 is further configured to:

parse the real-time control packet to obtain a third quantity of all the RTP data packets sent by the transmit end and a fourth quantity of bytes included in all the RTP data packets, where the real-time control packet carries the third quantity and the fourth quantity;

separately obtain a maximum transmission unit MTU value corresponding to a link between any two adjacent nodes in nodes, in the transmission link, that are between the transmit end and the to-be-detected node; and determine, according to the third quantity, the fourth quantity, and the obtained MTU value, the second quantity of the IP data packets that the to-be-detected node needs to bear.

When determining, according to the third quantity, the fourth quantity, and the obtained MTU value, the second quantity of the IP data packets that the to-be-detected node needs to bear, the calculation unit 203 is further configured to:

obtain, by means of screening, a minimum MTU value from the MTU values as a target MTU value;

determine a quantity of valid bearer bytes in the target MTU value according to the target MTU value;

obtain, according to the third quantity, the fourth quantity, and the quantity of the valid bearer bytes, a quantity of IP data packets that need to be borne for transmitting each RTP data packet; and obtain, based on the third quantity and the quantity of the IP data packets that need to be borne for transmitting each RTP data packet, the second quantity of the IP data packets that the to-be-detected node needs to bear.

When determining the operating status of the to-be-detected node according to the absolute value of the quantity difference and the value of the threshold, the processing unit 204 is further configured to:

determine that the operating status of the to-be-detected node is a normal state when the absolute value of the quantity difference is less than the threshold; or determine that the operating status of the to-be-detected node is a faulty state when the absolute value of the quantity difference is greater than or equal to the threshold.

When selecting one node in all the nodes as a to-be-detected node, the selection unit 201 is further configured to:

select, as the to-be-detected node, an undetected node that is in all the nodes and that is at a shortest distance from the receive end; or select, as the to-be-detected node, an undetected node that is in all the nodes and that is at a middle location between the transmit end and the receive end.

When sending the detection instruction to the to-be-detected node, the selection unit 201 is further configured to:

send, to the to-be-detected node, a detection instruction carrying a transmit end IP address, a receive end IP address, and an RTCP port number.

Figure 3:
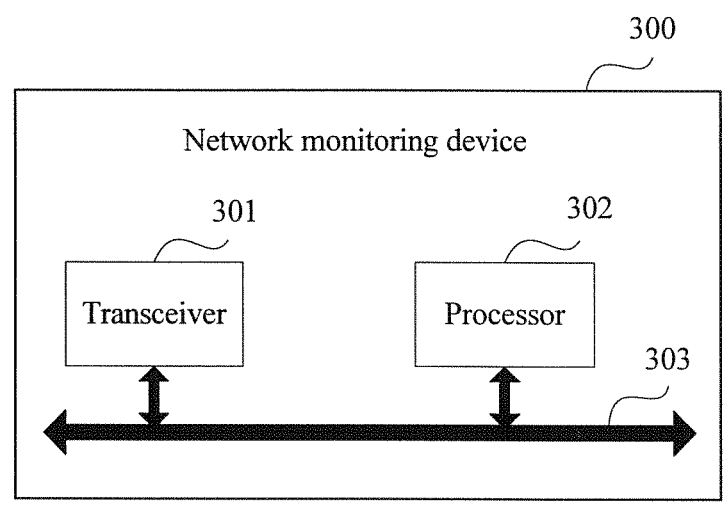
FIG. 3 is a schematic structural diagram of a network monitoring device according to an embodiment of the present disclosure.

Based on the foregoing embodiments, the present disclosure further provides a network monitoring device 300, for example, an SDN controller. Referring to FIG. 3, the device includes a transceiver 301, a processor 302, and a bus 303.

The transceiver 301 and the processor 302 are interconnected by using the bus 303. The bus 303 may be a peripheral component interconnect (PCI) bus or an extended industry standard architecture (EISA) bus, and the like. The bus may be classified into an address bus, a data bus, a control bus, and the like. For ease of indication, the bus is denoted by using only one thick line in FIG. 3; however, it does not indicate that there is only one bus or only one type of bus.

The transceiver 301 is configured to send a detection instruction to a to-be-detected node, and receive a real-time control packet and a first quantity of Internet Protocol IP data packets forwarded by the to-be-detected node, where the real-time control packet and the first quantity are returned by the to-be-detected node based on the detection instruction.

The processor 302 is configured to implement the method for detecting an operating status of a node shown in FIG. 1 in the embodiments of the present disclosure, including:

selecting, from nodes included on a transmission link established between a transmit end and a receive end, one node in the nodes as the to-be-detected node, and sending the detection instruction to the to-be-detected node;

receiving the real-time control packet and the first quantity of the IP data packets forwarded by the to-be-detected node, where the real-time control packet and the first quantity are returned by the to-be-detected node based on the detection instruction, and the real-time control packet carries a quantity of all RTP data packets sent by the transmit end and a quantity of bytes included in all the RTP data packets;

determining, according to the real-time control packet, a second quantity of IP data packets that the to-be-detected node needs to bear; and obtaining a specified threshold and a quantity difference between the first quantity and the second quantity, and determining an operating status of the to-be-detected node according to an absolute value of the quantity difference and a value of the threshold.

When the processor 302 is a network processor NP, the network monitoring device 300 further includes a memory 304 (not shown in the figure). The memory 304 is configured to store a program. The program may include program code, where the program code includes a computer operation instruction. The memory 304 may include a random access memory (RAM), and may further include a non-volatile memory (NVM), for example, at least one magnetic disk memory. The processor 302 executes an application program stored in the memory 304, to implement the foregoing data transmission method.

In conclusion, the embodiments of the present disclosure provide the method and the apparatus for detecting an operating status of a node. In the method, one node in nodes of a transmission link established between a transmit end and a receive end is selected as a to-be-detected node, and a detection instruction is sent to the to-be-detected node; a real-time control packet and a first quantity of IP data packets forwarded by the to-be-detected node are received, where the real-time control packet and the first quantity are returned by the to-be-detected node based on the detection instruction; a second quantity of IP data packets that the to-be-detected node needs to bear is determined according to the real-time control packet; a specified threshold and a quantity difference of the first quantity and the second quantity are obtained, and an operating status of the to-be-detected node is determined according to an absolute value of the quantity difference and a value of the threshold, where the real-time control packet carries a quantity of all RTP data packets sent by the transmit end and a quantity of bytes included in all the RTP data packets. According to the real-time control packet, an operating status of a node in a network can be obtained quickly and accurately. When an operating status of each node in the network is obtained, a fault source can be located. This avoids a problem that fault maintenance of a node is delayed and multimedia data real-time transmission efficiency is lowered because a fault source cannot be located. Compared with the prior art that a network status in a network is determined by using a probe packet, in the method for detecting an operating status of a node provide in the embodiments of the present disclosure, because a network probe packet does not need to be sent, an operating status of a node between a transmit end and a receive end may be accurately determined without changing a network status. This decreases a network load, and improves RTP stream transmission efficiency.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a function in one or more processes in the flowcharts and/or in one or more blocks in the block diagrams.

These computer program instructions may be stored in a computer readable memory that can instruct the computer or any other programmable data processing device to work in a manner, such that the instructions stored in the computer readable memory generate an artifact that includes an instruction apparatus. The instruction apparatus implements a function in one or more processes in the flowcharts and/or in one or more blocks in the block diagrams.

These computer program instructions may be loaded onto a computer or another programmable data processing device, such that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method implemented by a network monitoring device for detecting an operating status of a node, the method comprising:

selecting, by the network monitoring device, from nodes comprised on a transmission link established between a transmit end and a receive end, one node in the nodes as a to-be-detected node, and sending a detection instruction to the to-be-detected node;

receiving, by the network monitoring device, a real-time control packet and a first quantity of Internet Protocol (IP) data packets forwarded by the to-be-detected node, wherein the real-time control packet and the first quantity are returned by the to-be-detected node based on the detection instruction, and the real-time control packet carries a quantity of all Real-time Transport Protocol (RTP) data packets sent by the transmit end and a quantity of bytes comprised in all the RTP data packets;

determining, by the network monitoring device, according to the real-time control packet, a second quantity of IP data packets that the to-be-detected node needs to bear; and obtaining, by the network monitoring device, a specified threshold and a quantity difference between the first quantity and the second quantity, and determining an operating status of the to-be-detected node according to the quantity difference and a value of the threshold.

2. The method according to claim 1, wherein the real-time control packet is a Real-Time Transport Control Protocol (RTCP) packet.

3. The method according to claim 1, wherein determining, according to the real-time control packet, a second quantity of IP data packets that the to-be-detected node needs to bear comprises:

parsing the real-time control packet to obtain a third quantity of all the RTP data packets sent by the transmit end and a fourth quantity of bytes comprised in all the RTP data packets, wherein the real-time control packet carries the third quantity and the fourth quantity;

separately obtaining a maximum transmission unit (MTU) value corresponding to a link between any two adjacent nodes in nodes, in the transmission link, that are between the transmit end and the to-be-detected node; and determining, according to the third quantity, the fourth quantity, and the MTU value, the second quantity of the IP data packets that the to-be-detected node needs to bear.

4. The method according to claim 3, wherein determining, according to the third quantity, the fourth quantity, and the MTU value, the second quantity of the IP data packets that the to-be-detected node needs to bear comprises:

obtaining, over screening, a minimum MTU value from the MTU values as a target MTU value;

determining a quantity of valid bearer bytes in the target MTU value according to the target MTU value;

obtaining, according to the third quantity, the fourth quantity, and the quantity of the valid bearer bytes, a quantity of IP data packets that need to be borne for transmitting each RTP data packet; and obtaining, based on the third quantity and the quantity of the IP data packets that need to be borne for transmitting each RTP data packet, the second quantity of the IP data packets that the to-be-detected node needs to bear.

5. The method according to claim 1, wherein determining an operating status of the to-be-detected node according to an absolute value of the quantity difference and a value of the threshold comprises:

determining that the operating status of the to-be-detected node is a normal state when the absolute value of the quantity difference is less than the threshold.

6. The method according to claim 1, wherein determining an operating status of the to-be-detected node according to an absolute value of the quantity difference and a value of the threshold comprises:

determining that the operating status of the to-be-detected node is a faulty state when the absolute value of the quantity difference is greater than or equal to the threshold.

7. The method according to claim 1, wherein selecting one node in the nodes as a to-be-detected node comprises:

selecting, as the to-be-detected node, an undetected node that is in the nodes and that is at a middle location between the transmit end and the receive end.

8. The method according to claim 1, wherein selecting one node in the nodes as a to-be-detected node comprises:
selecting, as the to-be-detected node, an undetected node that is in the nodes and that is at a middle location between the transmit end and the receive end.

9. The method according to claim 1, wherein sending a detection instruction to the to-be-detected node comprises:
sending, to the to-be-detected node, a detection instruction carrying a transmit end IP address, a receive end IP address, and an RTCP port number.

10. The method according to claim 1, wherein the detection instruction further includes a query instruction used to query for querying the first quantity of IP data packets forwarded by the to-be-detected node.

11. An apparatus for detecting an operating status of a node, the apparatus comprising:
a transceiver;
a processor coupled to the transceiver via a bus;
wherein the transceiver is configured to:
send a detection instruction to a to-be-detected node, and
receive a real-time control packet and a first quantity of Internet Protocol (IP) data packets forwarded by the to-be-detected node, wherein the real-time control packet and the first quantity are received based on the detection instruction, and the real-time control packet carries a quantity of all Real-time Transport Protocol (RTP) data packets sent by a transmit end and a quantity of bytes comprised in all the RTP data packets; and
the processor is configured to:
select, from nodes comprised on a transmission link established between the transmit end and a receive end, one node in the nodes as the to-be-detected node,
determine, according to the real-time control packet, a second quantity of IP data packets that the to-be-detected node needs to bear, and
obtain a specified threshold and a quantity difference between the first quantity and the second quantity, and determine an operating status of the to-be-detected node according to an absolute value of the quantity difference and a value of the threshold.

12. The apparatus according to claim 11, wherein the real-time control packet is a Real-Time Transport Control Protocol (RTCP) packet.

13. The apparatus according to claim 11, wherein the processor is further configured to:
parse the real-time control packet to obtain a third quantity of all the RTP data packets sent by the transmit end and a fourth quantity of bytes comprised in all the RTP data packets, wherein the real-time control packet carries the third quantity and the fourth quantity;
separately obtain a maximum transmission unit (MTU) value corresponding to a link between any two adjacent nodes in nodes, in the transmission link, that are between the transmit end and the to-be-detected node; and determine, according to the third quantity, the fourth quantity, and the MTU value, the second quantity of the IP data packets that the to-be-detected node needs to bear.

14. The apparatus according to claim 13, wherein when determining, according to the third quantity, the fourth quantity, and the MTU value, the second quantity of the IP data packets that the to-be-detected node needs to bear, the processor is further configured to:
obtain, by means of screening, a minimum MTU value from the MTU values as a target MTU value;
determine a quantity of valid bearer bytes in the target MTU value according to the target MTU value;
obtain, according to the third quantity, the fourth quantity, and the quantity of the valid bearer bytes, a quantity of IP data packets that need to be borne for transmitting each RTP data packet; and
obtain, based on the third quantity and the quantity of the IP data packets that need to be borne for transmitting each RTP data packet, the second quantity of the IP data packets that the to-be-detected node needs to bear.

15. The apparatus according to claim 11, wherein when determining the operating status of the to-be-detected node according to the absolute value of the quantity difference and the value of the threshold, the processor is further configured to:
determine that the operating status of the to-be-detected node is a normal state when the absolute value of the quantity difference is less than the threshold.

16. The apparatus according to claim 11, wherein when determining the operating status of the to-be-detected node according to the absolute value of the quantity difference and the value of the threshold, the processor is further configured to:
determine that the operating status of the to-be-detected node is a faulty state when the absolute value of the quantity difference is greater than or equal to the threshold.

17. The apparatus according to claim 11, wherein when selecting one node in the nodes as the to-be-detected node, the processor is further configured to:
select, as the to-be-detected node, an undetected node that is in the nodes and that is at a shortest distance from the receive end.

18. The apparatus according to claim 11, wherein selecting one node in the nodes as the to-be-detected node, the processor is further configured to:
select, as the to-be-detected node, an undetected node that is in the nodes and that is at a middle location between the transmit end and the receive end.

19. The apparatus according to claim 11, wherein when sending the detection instruction to the to-be-detected node, the transceiver is further configured to:
send, to the to-be-detected node, a detection instruction carrying a transmit end IP address, a receive end IP address, and an RTCP port number.

20. The apparatus according to claim 11, wherein the detection instruction further includes a query instruction for querying the first quantity of IP data packets forwarded by the to-be-detected node.

* * * * *